United States Patent [19]
Blaetz et al.

[11] 3,719,138
[45] March 6, 1973

[54] FROZEN SANDWICH AND PROCESS FOR PREPARING SAME

[75] Inventors: Philip H. Blaetz, Barrington; Orin K. Corbige, Glenview, both of Ill.

[73] Assignee: Kraftco Corporation, New York, N.Y.

[22] Filed: Feb. 9, 1970

[21] Appl. No.: 9,985

[52] U.S. Cl. .................. 99/192, 99/86, 99/192 BB
[51] Int. Cl. .................. A21d 13/00, A21d 15/00
[58] Field of Search .................... 99/86, 192, 192 BB

[56] References Cited

UNITED STATES PATENTS

| | | | |
|---|---|---|---|
| 2,093,069 | 9/1937 | Bedford | 99/192 |
| 2,145,393 | 1/1939 | Hergert | 99/192 |
| 2,162,213 | 6/1939 | Conn | 99/192 |
| 2,834,677 | 5/1956 | Geisler | 99/172 |
| 3,083,651 | 4/1963 | Cooper | 99/86 X |
| 3,189,463 | 6/1965 | Jones | 99/86 |

*Primary Examiner*—Raymond N. Jones
*Attorney*—Fitch, Even, Tabin & Luedeka

[57] ABSTRACT

A filled sandwich is provided which is suitable for heating in a vertical position without loss of filling and which may be reheated from a frozen condition without excessive browning of the exterior surface of the sandwich. To prevent browning the frozen sandwich is treated by applying moisture to the exterior surfaces of the sandwich while the sandwich is frozen. Thereafter, the sandwich is returned to frozen storage. During subsequent heating of the sandwich from the frozen state the excess moisture acts to cool the exterior surface of the bread slices during heating until the interior of the sandwich is heated.

15 Claims, No Drawings

FROZEN SANDWICH AND PROCESS FOR PREPARING SAME

The present invention relates generally to a snack food product and more particularly relates to a snack food product of the sandwich variety which may be heated in a vertical position without loss of filling and may be heated from a frozen condition without excessive browning of the exterior surface of the sandwich.

Convenience food products are a rapidly expanding segment of the food industry. In this connection, numerous convenience foods have been developed, which may be frozen and thereafter readily heated directly from a frozen condition by the consumer by inserting the food product into a heating device, such as a household toaster. It would be desirable to develop a filled sandwich type convenience food which can be heated in a vertical position by means of a household toaster. However, there are numerous problems in connection with heating a filled sandwich type food product in a vertical position. For example, the filling of the sandwich must not be permitted to escape from the sandwich into the mechanism of the heating device. Also, if the sandwich is stored in a frozen condition, it would be desirable to take the sandwich from the freezer and place it immediately in the heating device. However, if this is done, frequently the exterior of the sandwich will thaw and brown prior to warming or heating of the interior of the sandwich. The result is a sandwich which either has a cold, unheated interior with a properly browned exterior, or a sandwich which has a darkened, excessively browned exterior with a properly heated interior.

Accordingly, it is the principal object of the present invention to provide a sandwich type food product which may be stored in a frozen condition and which may be heated throughout directly from a frozen condition without undue browning of the exterior surfaces of the sandwich. It is another object of the present invention to provide a frozen sandwich type food product which has been precook prior to freezing and which may be heated throughout without undue browning of the exterior surfaces of the sandwich. It is a further object of the present invention to provide a filled sandwich which may be stored in a frozen condition and which may be heated in a vertical position without loss of filling or undue browning of the exterior surfaces of the sandwich. It is a still further object of the invention to provide a method for heating frozen bread products without undue browning of the exterior of the bread product.

These and other objects of the invention will become more apparent from the following detailed description.

In general, in a method embodying various features of the invention, a filled sandwich is provided which is suitable for heating in a vertical position without loss of filling. In preparing the sandwich, slices of bread are treated so as to provide a thin layer of a readily hydrated hydrocolloid on at least one surface of each slice of bread. Thereafter, a layer of sandwich filling is applied to the treated surface of at least one of the bread slices. The treated sides of the bread slices are then placed in face-to-face contact so as to form a sandwich. The readily hydrated colloid is thereafter hydrated in situ by absorption of moisture from the bread and from the sandwich filling.

The sandwich is thereafter stored by freezing. Preheating of the sandwich directly from a frozen condition may be accomplished by the method of the invention without excessive browning of the exterior surface of the sandwich. In the method, the frozen sandwich is treated by applying moisture to the exterior surfaces of the sandwich while the sandwich is frozen. The sensible heat of the sandwich is such that the moisture is frozen on the surface of the sandwich to form a glaze. Thereafter, the sandwich is returned to frozen storage. During subsequent heating of the sandwich from the frozen state, the excess moisture acts to cool the surface of the bread slices during heating until the interior of the sandwich is heated.

It is anticipated that the novel sandwich of the invention will find its greatest use in providing sandwiches which may be directly heated from a frozen condition in a household toaster. For such applications, the bread slices should be sufficiently thin so that at least two bread slices can be used along with a suitable amount of filling and still provide a sandwich thin enough to insert in the slot of a conventional household toaster. For such applications, the bread slices should be no greater than about one-fourth inches thick.

In general, the term "bread" is used herein in its broad sense and refers to any commercially available leavened or unleavened product prepared from a dough comprising flour, water and a fat. The dough may further contain eggs, fruit, nuts or a sweetening agent, such as sugar, honey, molasses, syrup or artificial sweeteners. The method of the invention is generally applicable to prevent undue browning while heating any frozen bread products. The bread product may be formed into a sandwich, as previously described, or may be a single piece. The bread produced may be previously browned or may be in unbrowned condition. That is, the method of the invention may be used to provide a warmed, unbrowned bread product by heating a frozen, unbrowned bread product which has been treated in accordance with the invention.

It is preferred that the hydrocolloid used in preparing frozen sandwiches be an edible hydrocolloid which will readily hydrate in situ by absorption of moisture from the bread or a sandwich filling applied thereto. Suitable hydrocolloids include pre-gelatinized starch, carboxymethylcellulose, propylene glycol alginate and sodium alginate. The hydrocolloid may be applied in a dry form or a slurry of the hydrocolloid may be used. Hydrated slurries of hydrocolloids which do not readily hydrate may also be used. Such hydrocolloids include unmodified starch, carrageenan, guar gum, carob gum, gum tragacanth and gelatin. Preferred hydrocolloids are pre-gelatinized starches, such as cornstarch, potato starch or the like. For reasons of economy and availability, it is particularly preferred to use a pre-gelatinized cornstarch. The hydrocolloid may be applied to the surface of the bread slice by any suitable means, such as by dusting the hydrocolloid onto the surface of the bread slice.

The hydrocolloid, after being hydrated, acts to cause the sandwich filling to adhere to the bread slice so that the assembled sandwich may be heated in a vertical position without loss of filling. The hydrocolloid also lessens the tendency of the edges of the sandwich to curl. Such curling is undesirable in that it may inhibit withdrawal of the sandwich from the toaster. The hydrocolloid is added to the bread slice at a level sufficient to provide the desired amount of adherence of the sandwich filling to the bread slice. In general, a level of hydrocolloid of from about 0.01 grams to about 0.04 grams per square inch of bread slice is sufficient to provide the desired adherence. Levels of hydrocolloid up to about 0.05 grams per square inch of bread slice may be used. Higher levels of hydrocolloid may also be used, but no additional advantage is attained therefrom.

After the hydrocolloid is applied to the surface of the bread slice, a sandwich filling is added to the surface of the bread slice which has been treated with the hydrocolloid. Any suitable sandwich filling may be used. It is preferred to use sandwich fillings which have some appreciable level of moisture therein so as to aid in the hydration of the hydrocolloid. For example, such sandwich fillings as ham salad, chicken salad, or the like are particularly preferred.

After the sandwich filling has been applied to the treated surface of one slice of bread, the sandwich may be assembled by placing the treated surface of a second slice of bread in face-to-face contact with the first slice of bread with the sandwich filling located between the two slices of bread.

After the sandwich is assembled, the sandwich may be heated by suitable means to effect partial cooking of the sandwich and partial browning of the exterior surface of the sandwich. Such heating is, however, optional and is usually performed only on those types of sandwiches which are traditionally served in a cooked condition. A preferred method of effecting heating is to grill the sandwich on both sides after applying a light coating of a suitable edible fat to the surface of the sandwich. Suitable edible fats include butter, margarine, salad oil, shortening or the like. After the sandwich has been heated to effect cooking and browning of the exterior surface, the sandwich is frozen. No particular precautions are required for freezing the sandwich, but the temperature of the sandwich should be reduced to at least below about 25°F.

After the sandwich has been frozen, moisture is applied to both surfaces of the frozen sandwich. It is preferred to reduce the temperature of the sandwich to about 0°F prior to applying the moisture so that the cooling capacity of the sandwich is sufficient to immediately freeze the moisture and form a glaze. The moisture acts as a barrier layer and the moisture is evaporated prior to heating of the surface of the sandwich during subsequent reheating of the sandwich. The barrier layer of moisture must be evaporated before additional browning of the sandwich can occur. The barrier layer of moisture thus retards or delays additional browning of the exterior surface of the sandwich until the interior contents, i.e., the filling of the sandwich, can be heated.

Moisture which is applied to the surface of the sandwich should not be absorbed therein. Consequently, the sandwich is frozen prior to application of the moisture to prevent seepage of the moisture into the interior of the bread slices of the sandwiches. As indicated above, the sandwich is frozen to a temperature of at least 25°F so that thawing of the bread slice does not occur when moisture is applied thereto. It is preferable that the temperature of the sandwich be reduced to 0°F or below to insure that initial contact of the moisture with the surface of the sandwich does not cause local thawing and seepage of moisture into the interior of the bread slices.

It has been found that the problem of excessive browning is particularly prevalent around the edges of the sandwich. Therefore, it is preferred that the majority of the moisture which is applied be concentrated around the periphery of the sandwich, that is, the edges of the sandwich. However, a uniform coating of moisture onto the surface of the sandwich is not deleterious and provides the advantages of the invention.

In general, it is preferred that the moisture be added at a level of from about 0.01 to about 0.3 ml. of moisture per square inch of bread surface. However, higher levels of moisture may also be used up to a level of about 0.5 mls. of moisture per square inch of bread surface without any deleterious effect. The greater the extent of pre-browning that has been effected the higher the level of moisture within the indicated range should be. The surface of the sandwich may be fully pre-browned prior to freezing and additional browning will not occur when a sufficient level of moisture is applied to the surface. It should be understood that the method of the invention is also applicable to sandwiches containing a single slice of bread and to sandwiches containing more than two slices of bread. The method of the invention is also applicable to non-sandwich type bread products, such as rolls, waffles, doughnuts, cookies or cake. For such applications, intermediate slices of bread would be treated by applying a layer of hydrocolloid onto both surfaces of the intermediate bread slice.

After application of the moisture to the frozen sandwiches, the sandwiches are immediately placed in frozen storage so as to prevent melting of the moisture glaze on the surface of the sandwich. As before indicated, during subsequent heating of the sandwich, the thin moisture glaze is first melted and evaporated before any heating and browning of the surface of the bread slice occurs. This prevents browning of the bread slice from occurring before the interior of the sandwich has been heated.

The following example further illustrates various features of the invention, but is intended to in no way limit the scope of the invention, which is defined in the appended claims.

EXAMPLE

Sandwiches are prepared in accordance with the invention. Slices of white bread, which are one-fourth inches thick, are treated so as to apply a thin layer of pre-gelatinized cornstarch thereto. The cornstarch is dusted onto one surface of each bread slice so as to provide 0.025 grams of cornstarch per square inch of surface of the bread slice. A sandwich filling having the following composition is then applied to the treated side of one slice of bread:

| Ingredients | Weight Percent |
| --- | --- |
| Peanut Butter | 65 |
| Apple Jelly | 35 |

The sandwich is then assembled by placing a second slice of bread with a treated surface onto the sandwich filling which has been applied to the first slice of bread. Thereafter, margarine is sprayed onto the exterior surface of both sides of a portion of the sandwiches and these sandwiches are grilled so as to effect even browning thereof. The remaining portion of the sandwiches are left ungrilled.

The grilled and ungrilled sandwiches are then frozen in a freezer having a constant temperature of −15°F. The sandwiches are permitted to come to temperature equilibrium in the freezer and are then removed therefrom.

Moisture is then applied to both surfaces of each sandwich by spraying a thin mist of moisture onto each surface. The moisture is applied at a level of 0.13 grams per square inch of sandwich surface to the grilled sandwiches and at a level of 0.05 grams per square inch to the ungrilled sandwiches. The sandwiches are then replaced in the freezer and allowed to come to temperature equilibrium. The sandwiches are then removed from the freezer and directly heated in a household toaster. The toaster is adjusted to permit heating to occur for 4 minutes. After heating, the sandwich is warmed throughout. The grilled sandwiches show no additional browning of the sandwich while the ungrilled sandwiches remain white. No loss of sandwich filling is observed during heating of the sandwich.

What is claimed is:

1. In a method for freezing bread products and heating said frozen bread product to provide a heated bread product without undesirable browning, the improvement comprising applying moisture at a level of from about .1 to about .5 milliliters of moisture per square inch of bread product surface to the exterior surface of a frozen bread product and refreezing, whereby when said frozen bread product is heated from the frozen state, a heated bread product is provided without undue browning.

2. A method in accordance with claim 1 wherein the temperature of the frozen bread product is sufficient to freeze said moisture upon contact of the moisture with the surface of the bread product.

3. A method in accordance with claim 1 wherein said moisture is applied substantially around the periphery of the frozen bread product.

4. A method in accordance with claim 1 wherein said bread product is a bread slice and wherein a sandwich is provided from at least two of said bread slices and a filling.

5. A method in accordance with claim 1 wherein said bread product is at least partially browned prior to freezing of said bread product.

6. A method for providing a frozen sandwich which may be uniformly heated in a vertical position without undue browning and without loss of filling, which comprises treating slices of bread so as to provide a thin layer of a hydrated hydrocolloid on at least one surface thereof, applying a layer of sandwich filling on the treated surface of at least one of said slices of bread and placing the treated side of at least one other bread slice in face-to-face relation so as to form a sandwich, freezing said sandwich, applying moisture to the exterior surface of said frozen sandwich and refreezing.

7. A method in accordance with claim 6 wherein said hydrocolloid is selected from starch, carboxy-methyl-cellulose propylene glycol alginate, sodium alginate, carrageenan, guar gum, carob gum, gum tragacanth and gelating. gelatin.

8. A method in accordance with claim 6 wherein said hydrocolloid is a pre-gelatinized starch.

9. A method in accordance with claim 6 wherein said hydrocolloid is added to said bread slice at a level of from about 0.01 to about 0.04 gram per square inch.

10. A method in accordance with claim 6 wherein said moisture is applied at a level of from about 0.1 to about 0.5 milliliter or moisture per square inch of bread surface.

11. A method in accordance with claim 6 wherein the temperature of the sandwich is sufficient to freeze said moisture upon contact of the moisture with the surface of the sandwich.

12. A method in accordance with claim 6 wherein said moisture is applied substantially around the periphery of the sandwich.

13. A method in accordance with claim 6 wherein the sandwich is heated so as to at least partially brown the exterior of the sandwich prior to freezing of the sandwich.

14. A frozen sandwich which may be uniformly heated without undesirable browning which comprises at least two slices of bread and a filling assembled so as to provide a sandwich and a frozen layer of moisture on the exterior surface of said sandwich, said moisture having been applied to the exterior surfaces of said slices at a level of from about 0.1 to about 0.5 milliliters of moisture per square inch of bread surface.

15. A sandwich in accordance with claim 14 wherein said layer of moisture is present substantially around the periphery of said sandwich.

* * * * *